Feb. 11, 1930.    W. KOEHLER    1,746,731
PROCESS FOR THE DISINTEGRATION OF MATTER
Filed Jan. 21, 1929
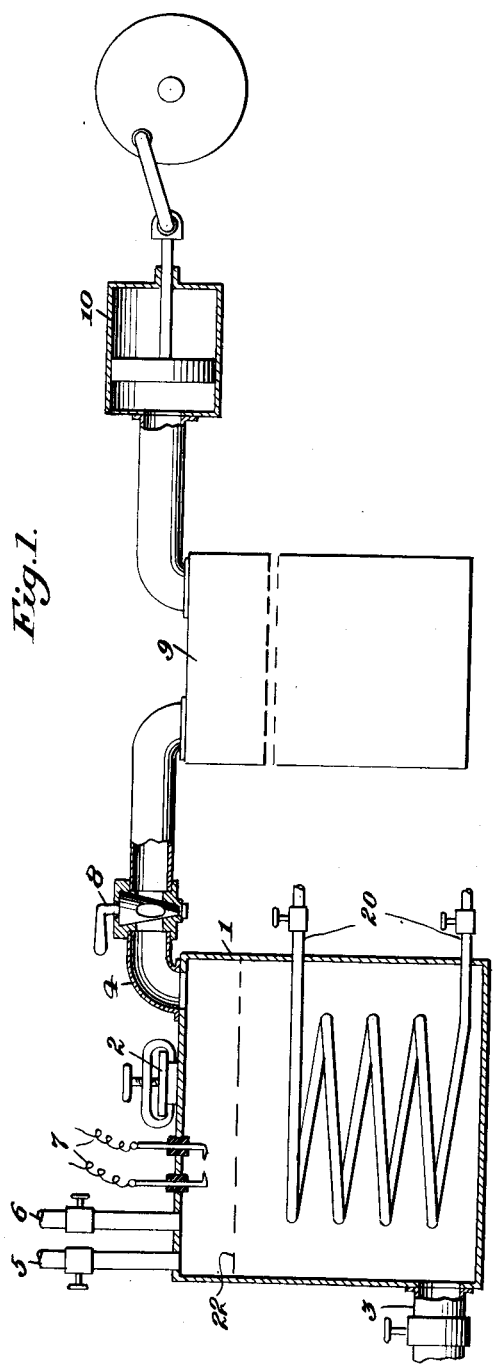
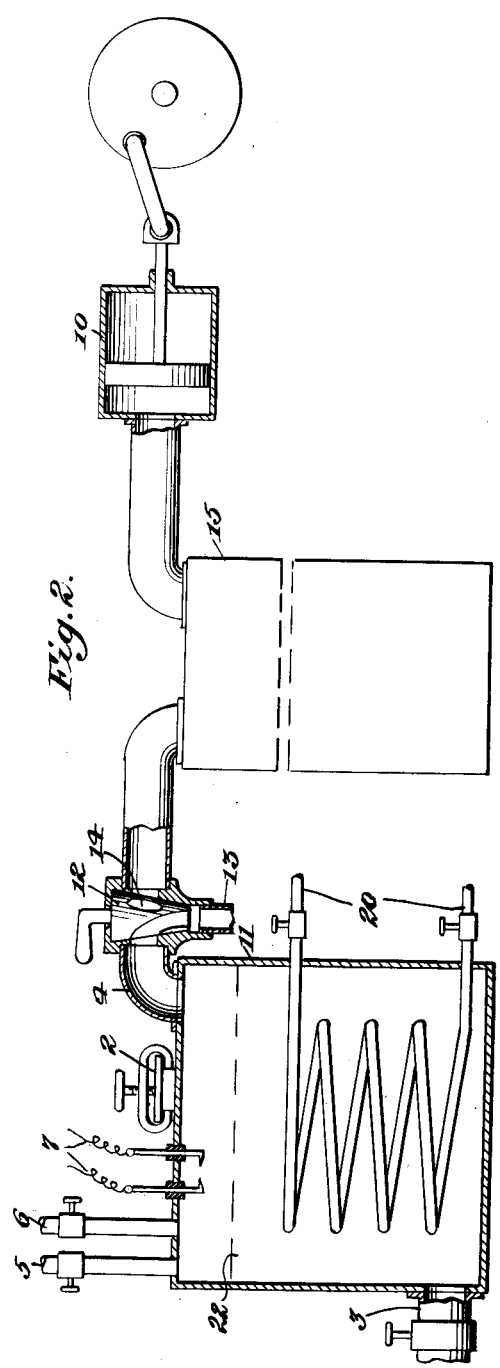
Inventor:
William Koehler,
Joseph W Harris
Att'y.

Patented Feb. 11, 1930

1,746,731

UNITED STATES PATENT OFFICE

WILLIAM KOEHLER, OF CLEVELAND, OHIO

PROCESS FOR THE DISINTEGRATION OF MATTER

Application filed January 21, 1929. Serial No. 333,978.

This application is a continuation in part of my application filed August 24, 1927, Serial Number 215,097.

This invention relates to a new and improved process for the disruption, disintegration, or breaking down of organic substances and inorganic materials, especially when in a minute form or condition, and carried in another substance or material, such as a fluid.

An object of my invention is to provide a simple and effective process for the disintegration of living organisms, such as spores, bacteria, microbes, germs, and the like; and for the breaking down of minute particles of materials, such as globules of oils, fats, emulsions, vegetable products and all types of cellular matter.

My invention, therefore, comprises a new and improved process for the disruption and disintegration of cellular matter, which consists in subjecting said matter in a closed receptacle to a disruptive action brought about by the sudden application of a prodigiously high pressure upon said matter, and then the sudden reduction or withdrawal of said prodigiously high pressure. The time interval between the application of the pressure and its withdrawal may vary with the product being treated, and the character of change desired in the product. The withdrawal of the pressure may be immediate, or several seconds may lapse before the release of the pressure. In some cases the pressure may be maintained for a relatively long period of time. When the pressure is immediately released, the product will have been subjected to a prodigiously violent shock, in that all of the parts of the product will have been instantly placed under a prodigiously high pressure, and at once released, the violence of the release causing an immediate and violent expansion of the cellular matter under compression, the violent expansion disrupting the cells and disintegrating the same. When a time interval has elapsed, as above noted, the contents of the cellular matter acquire the high pressure and upon the sudden release, the cellular matter bursts as if by an internal explosion.

My invention also contemplates subjecting the matter being treated, especially when living organisms are present, to the action of radiant energy, for example, heat, light, etc., conjointly with the violent application of the prodigious disruptive force, and its violent release.

My process is particularly adapted for sterilizing foodstuffs, whether solid or fluid, and materials in general which require, or may be benefited by, sterilization, and therefore I will particularly explain the process as applied for bringing about the sterilization of materials, but I do not wish to be understood as limiting the invention to this special application.

It is customary to sterilize materials or substances by subjecting the same to a predetermined heat for a definite length of time. Also, sterilization of materials has been secured by subjecting the materials to a high pressure for a definite length of time, and in U. S. Letters Patent No. 1,440,868, granted to V. L. Emerson, Jan. 2nd, 1923, a method is disclosed for bringing about the sterilization of materials by imparting a shock or concussive impact to the materials.

My invention provides a process of sterilization which will be more positive in its operation, and which can be carried out with simpler mechanism than processes now in common use.

The accompanying drawing illustrates, diagrammatically, simple forms of apparatus which may be used to carry out the process, although other types of apparatus may also be used.

Figure 1, illustrates one type of treatment tank connected to an exhaust tank, and Figure 2 illustrates a treatment tank and an exhaust tank connected by a three-way valve; which latter may discharge excess pressure direct to a flue, or otherwise take care of the same, and then connect the treatment tank with the exhaust tank.

In Figure 1, a treatment tank 1, is provided with a filling opening 2, a discharge 3, and an exhaust outlet 4. Gas admission pipes, 5 and 6, conduct controlled supplies of suitable gases to tank 1, and spark terminals 7 are connected to a suitable source of electric energy. The exhaust outlet 4 contains a valve 8, and is connected to the exhaust tank 9, which latter is connected to a pump 10 thereby maintaining a high degree of exhaustion in tank 9. The valve 8 may be operated automatically, or manually. The pipe 20 may be used to heat or cool the product, if desired.

In Figure 2, the treatment tank 11 is connected to a three-way valve 12, one outlet 13 from which may discharge direct into the atmosphere, or may be connected to a flue, or other receiver. The passage 14 through the valve 12 is arranged to connect tank 11 with tank 15, as in Figure 1, upon a proper movement of the valve.

The process may be applied to the sterilization of water, milk, fruit juices, and many similar products.

The operation of the process is as follows:—

If it is desired to sterilize milk, a sufficent quantity, is admitted to tank 1 through opening 2, for example to line 22, and the opening then closed. Suitable gases, for example hydrogen and oxygen, in the desired proportion, two atoms of hydrogen to one atom of oxygen, are admitted through pipes 5 and 6, until a desired pressure is reached, and then the valves in pipes 5 and 6 are closed. The supply of the gases may be controlled automatically, or manually. The gaseous mixture is then exploded by passing an electric spark across the terminals 7, whereupon a prodigious pressure is produced, due to the explosion, and also a development of considerable radiant energy, including heat, light, and other rays.

The milk is subjected to the combined action of the prodigious pressure and radiant energy, the application of the pressure producing a sudden contraction or condensation of any cellular matter, which tends to break down the cell tissues. Immediately after the explosion, the valve 8 is opened, either manually, or preferably automatically by machinery, and the gaseous or vaporous matter withdrawn into the vacuum receiver 9, producing a sudden reduction of pressure in the tank 1. The milk will have been subjected by the process to a sudden prodigious pressure which tends to crush all cellular matter, and then immediately to a sudden withdrawal of pressure, the latter having the effect of bursting or disrupting cellular matter in milk. If the cellular matter consists of living organisms, such as bacteria, microbes, etc., such organisms are immediately killed by the combined actions of prodigious pressure and reduction of pressure.

Drinking water, fruit juices, etc., are also rendered sterile by the same treatment.

For some products, for example fruit juices, it may be advantageous to generate a gas during the process that will retard or prevent fermentation, or otherwise preserve the product.

For such purposes, a mixture of carbon-oxy-sulphide COS, and oxygen, in proportions to form sulphur dioxide and carbon dioxide, may be used, the mixed gases exploded and the reaction products immediately withdrawn, so as to produce the effects of prodigious pressure and vacuum.

Mixtures of producer gas, carbon monoxide, and hydrogen and sufficient oxygen to form carbon dioxide and water, may be exploded, and the reaction products immediately withdrawn. Also, carbon monoxide and oxygen in proportions to form carbon dioxide may be used. Also, oxygen and methane, oxygen and ethylene, and oxygen and other gaseous or vaporized hydrocarbons. Also with some products, a mixture of hydrogen and chlorine may be used, the reaction products being immediately withdrawn after the explosion, leaving but a trace of hydrochloric acid dissolved in the product. Also, carbon disulphide and oxygen may be used; and hydrogen sulphide and oxygen.

Explosives of gaseous mixtures such as herein described are accompanied by the development of radiant energy in some cases, including ultra violet rays, and other chemically reacting and germicidal rays, as well as light and heat. The radiant energy is believed to contribute to the sterilization of the product being treated.

I do not wish to limit myself to any particular type or form of apparatus in practicing my process, since various devices may be employed; and different methods of heating or cooling the product may be employed when such treatment is desirable.

I claim:—

1. The method of treating matter as described which comprises confining said matter in a receptacle, admitting a supply of gas like explosive agents to said receptacle, until a desired pressure is reached, exploding said agents in contact with said matter and exposing said matter to a prodigious pressure and to the radiant energy produced by said explosion, and then suddenly reducing the pressure in said receptacle.

2. The method of treating matter as described, which comprises confining said matter in a receptacle, admitting a supply of hydrogen and oxygen to said receptacle, exploding said hydrogen and oxygen, and creating a prodigious pressure in said receptacle, and thereafter suddenly reducing the pressure in said receptacle.

3. The method of treating matter as described, which comprises confining said matter in a receptacle, admitting a supply of hydrogen and oxygen to said receptacle, exploding said hydrogen and oxygen, and exposing the matter to be treated to the radiant energy emitted during the explosion, and thereafter suddenly reducing the pressure in said receptacle.

4. A method for the purpose set forth comprising providing a closed receptacle for holding the material which is to be treated, partially filling said receptacle with the material, introducing into said receptacle a mixture of gases capable of explosion and of being suddenly reduced to a less voluminous form, through chemical combination, and then bringing about the explosion and reduction in volume of said gases and a consequent sudden reduction of pressure in the said receptacle.

5. A method for the purpose set forth comprising providing a closed receptacle for holding the material which is to be treated, partially filling said receptacle with the material, introducing into the receptacle under pressure a mixture of gases capable of explosion and of being suddenly reduced to a less voluminous form, and then producing a disruptive shock by bringing about the explosion and reduction in volume of said gases.

6. A method for the purpose set forth comprising providing a suitable receptacle adapted to be made air tight, placing the material which is to be treated in said receptacle so as to leave a predetermined space above or around said material, introducing into said receptacle under pressure a mixture of gases capable of chemical combination by explosion to form a product of less voluminous form, bringing about the explosion of said gases and permitting the effect produced by the explosion of said gases to react on said material.

7. A method for the sterilization of material comprising providing a closed receptacle, partially filling the receptacle with the material which is to be treated, introducing into the receptacle under pressure a mixture of gases consisting of two parts hydrogen and one part oxygen, then bringing about the association of the hydrogen and oxygen to form water and permitting the effects produced by the association of the hydrogen and oxygen to react on the said material.

8. A method for the sterilization of material comprising providing a closed receptacle, partially filling the receptacle with the material which is to be treated, introducing into the receptacle under pressure a mixture of hydrogen and oxygen, in the proportion that upon association they will form water producing the association of the hydrogen and oxygen by the passage of an electric spark and permitting the effects produced by the association of the hydrogen and oxygen to react on the said material.

9. The method of sterilizing liquids, which comprises, transferring said liquid to a closed receptacle, admitting a supply of explosive gases to said receptacle, exploding said gases while in contact with said liquid and subjecting said liquid to a sudden prodigious pressure, and then suddenly reducing the pressure.

10. The method of sterilizing liquids, which comprises, transferring said liquid to a closed receptacle, admitting a supply of explosive gases to said receptacle, exploding said gases while in contact with said liquid and subjecting said liquid to a sudden prodigious pressure, and to radiant energy, and then suddenly reducing the pressure.

In testimony whereof I hereby affix my signature.

WILLIAM KOEHLER.